US011410010B2

(12) United States Patent
Lotya et al.

(10) Patent No.: US 11,410,010 B2
(45) Date of Patent: *Aug. 9, 2022

(54) SMARTCARD WITH A COUPLING FRAME AND A WIRELESS CONNECTION BETWEEN MODULES (71) Applicant: AMATECH GROUP LIMITED, Spiddal (IE)

(72) Inventors: Mustafa Lotya, Celbridge (IE); David Finn, Tourmakeady (IE)

(73) Assignee: AMATECH GROUP LIMIIED, County Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,354

(22) Filed: May 3, 2020

(65) Prior Publication Data

US 2020/0327387 A1 Oct. 15, 2020

Related U.S. Application Data (63) Continuation-in-part of application No. 16/571,194, filed on Sep. 16, 2019, now abandoned, and a
(Continued)

(51) Int. Cl.
*G06K 19/06* (2006.01)
*G06K 19/07* (2006.01)

(52) U.S. Cl.
CPC ....... *G06K 19/072* (2013.01); *G06K 19/0707* (2013.01)

(58) Field of Classification Search
CPC ............. G06K 19/072; G06K 19/0707; G06K 7/0069; G06K 19/0723; G06K 19/07703; G06K 19/07749
(Continued)

(56) References Cited

U.S. PATENT DOCUMENTS 6,274,937 B1 * 8/2001 Ahn .................. H01L 23/49894
257/723
6,294,838 B1 * 9/2001 Peng ....................... H01L 24/48
257/777
(Continued)

FOREIGN PATENT DOCUMENTS

FR 2 776 796 1/1999
WO WO 2004/040507 5/2004
(Continued)

*Primary Examiner* — Thien M Le
(74) *Attorney, Agent, or Firm* — McAndrews, Held & Malloy, Ltd.

(57) ABSTRACT

A wireless connection is established between at least two electronic modules (M1, M2) disposed separate from one another in a smartcard having a coupling frame so that the two modules may communicate (signals, data) with each other. The two modules may each have module antennas (MA-1, MA-2), and may be disposed in respective two openings (MO-1, MO-2) of a coupling frame (CF). A coupling antenna (CPA) having two coupler coils (CC-1, CC-2) disposed close to the two modules antennas of the two modules. The coupling antenna may have only the two coupler coils (CC-1, CC-2), connected with one another, without the peripheral card antenna (CA) component of a conventional booster antenna (BA). Energy harvesting is disclosed.

27 Claims, 5 Drawing Sheets

Related U.S. Application Data continuation-in-part of application No. 16/246,495, filed on Jan. 13, 2019, now Pat. No. 10,824,931, which is a continuation-in-part of application No. 15/969,816, filed on May 3, 2018, now Pat. No. 10,518,518, which is a continuation-in-part of application No. 15/939,281, filed on Mar. 29, 2018, now Pat. No. 10,733,494, which is a continuation-in-part of application No. 15/358,138, filed on Nov. 22, 2016, now Pat. No. 9,960,476, which is a continuation-in-part of application No. 15/197,795, filed on Jun. 30, 2016, now Pat. No. 9,812,782, and a continuation-in-part of application No. 15/072,356, filed on Mar. 17, 2016, now Pat. No. 9,836,684, which is a continuation-in-part of application No. 14/862,119, filed on Sep. 22, 2015, now Pat. No. 9,697,459, said application No. 15/197,795 is a continuation-in-part of application No. 14/551,376, filed on Nov. 24, 2014, now Pat. No. 9,390,364, said application No. 15/072,356 is a continuation-in-part of application No. 14/492,113, filed on Sep. 22, 2014, now Pat. No. 9,798,968, which is a continuation-in-part of application No. 14/465,815, filed on Aug. 21, 2014, now Pat. No. 9,475,086, said application No. 15/072,356 is a continuation-in-part of application No. 14/465,815, said application No. 16/571,194 is a continuation-in-part of application No. 16/199,271, filed on Nov. 26, 2018, now Pat. No. 10,599,972.

(60) Provisional application No. 62/731,902, filed on Sep. 16, 2018.

(58) Field of Classification Search
USPC .................. 235/492, 487, 488, 375, 380
See application file for complete search history.

(56) References Cited

U.S. PATENT DOCUMENTS

| | | | |
|---|---|---|---|
| 9,147,068 B1 * | 9/2015 | Haddad | G06F 21/72 |
| 9,390,364 B2 | 7/2016 | Finn et al. | |
| 9,475,086 B2 | 10/2016 | Finn et al. | |
| 9,697,459 B2 | 7/2017 | Finn et al. | |
| 9,798,968 B2 | 10/2017 | Finn et al. | |
| 9,812,782 B2 | 11/2017 | Finn et al. | |
| 9,836,684 B2 | 12/2017 | Finn et al. | |
| 9,881,247 B2 | 1/2018 | Le Garrec et al. | |
| 10,193,211 B2 | 1/2019 | Finn et al. | |
| 10,248,902 B1 | 4/2019 | Finn et al. | |
| 10,518,518 B2 | 12/2019 | Finn et al. | |
| 10,733,494 B2 * | 8/2020 | Finn | G06K 19/07754 |
| 11,126,230 B1 * | 9/2021 | Chen | G06F 1/185 |
| 2002/0070280 A1 * | 6/2002 | Ikefuji | G06K 19/0726 235/492 |
| 2003/0214794 A1 * | 11/2003 | Takahashi | G06K 19/07749 361/761 |
| 2003/0234294 A1 * | 12/2003 | Uchihiro | G06K 19/07745 235/492 |
| 2006/0020371 A1 * | 1/2006 | Ham | G01N 24/08 700/266 |
| 2011/0140841 A1 * | 6/2011 | Bona | G07F 7/0846 340/5.83 |
| 2013/0076477 A1 | 3/2013 | Finn et al. | |
| 2014/0091149 A1 | 4/2014 | Finn et al. | |
| 2014/0361086 A1 | 12/2014 | Finn et al. | |
| 2015/0021402 A1 | 1/2015 | Finn et al. | |
| 2015/0021403 A1 | 1/2015 | Finn et al. | |
| 2015/0136858 A1 | 5/2015 | Finn et al. | |
| 2015/0235122 A1 | 8/2015 | Finn et al. | |
| 2015/0356399 A1 | 12/2015 | Finn et al. | |
| 2016/0110639 A1 | 4/2016 | Finn et al. | |
| 2016/0118711 A1 | 4/2016 | Finn et al. | |
| 2016/0365644 A1 | 12/2016 | Finn et al. | |
| 2017/0017871 A1 | 1/2017 | Finn et al. | |
| 2017/0077589 A1 | 3/2017 | Finn et al. | |
| 2018/0339503 A1 | 11/2018 | Finn et al. | |
| 2018/0341846 A1 | 11/2018 | Finn et al. | |
| 2019/0114526 A1 | 4/2019 | Finn et al. | |
| 2019/0197386 A1 | 6/2019 | Finn et al. | |
| 2020/0034578 A1 | 1/2020 | Finn et al. | |

FOREIGN PATENT DOCUMENTS

| | | |
|---|---|---|
| WO | WO 2017/090891 | 6/2017 |
| WO | WO 2017/198842 | 11/2017 |

* cited by examiner

FIG. 1 a typical dual-interface smartcard

FIG. 2
smartcard with display

FIG. 3 booster antenna (BA) with two coupler coils (CC-1, CC-2)

SMARTCARD WITH A COUPLING FRAME AND A WIRELESS CONNECTION BETWEEN MODULES

CROSS-REFERENCE TO RELATED APPLICATIONS

This application claims priority (filing date benefit) as nonprovisional or continuation-in-part of the following US patent applications:

This is a continuation-in-part of U.S. Ser. No. 16/571,194 filed 16 Sep. 2019

U.S. Ser. No. 16/571,194 is a nonprovisional of 62/731,902 filed 16 Sep. 2018

U.S. Ser. No. 16/571,194 is a continuation-in-part of U.S. Ser. No. 16/246,495 filed 13 Jan. 2019

U.S. Ser. No. 16/246,495 is a continuation-in-part of U.S. Ser. No. 15/969,816 filed 3 May 2018

U.S. Ser. No. 15/969,816 is a continuation-in-part of U.S. Ser. No. 15/939,281 filed 29 Mar. 2018

U.S. Ser. No. 15/939,281 is a continuation-in-part of U.S. Ser. No. 15/358,138 filed 22 Nov. 2016

U.S. Ser. No. 15/358,138 is a continuation-in-part of U.S. Ser. No. 15/197,795 filed 30 Jun. 2016

U.S. Ser. No. 15/358,138 is a continuation-in-part of U.S. Ser. No. 15/072,356 filed 17 Mar. 2016

U.S. Ser. No. 15/072,356 is a continuation-in-part of U.S. Ser. No. 14/862,119 filed 22 Sep. 2015

U.S. Ser. No. 15/197,795 is a continuation-in-part of U.S. Ser. No. 14/551,376 filed 24 Nov. 2014

U.S. Ser. No. 15/072,356 is a continuation-in-part of U.S. Ser. No. 14/492,113 filed 22 Sep. 2014

U.S. Ser. No. 14/492,113 is a continuation-in-part of U.S. Ser. No. 14/465,815 filed 21 Aug. 2014

U.S. Ser. No. 15/072,356 is a continuation-in-part of U.S. Ser. No. 14/465,815 filed 21 Aug. 2014

U.S. Ser. No. 16/571,194 is a continuation-in-part of U.S. Ser. No. 16/199,271 filed 26 Nov. 2018

Attention is also directed to commonly-owned, copending U.S. Ser. No. 16/798,368 filed 23 Feb. 2020, but no priority (filing date benefit) claim is being made thereto.

TECHNICAL FIELD

The disclosure relates broadly to RFID devices such as smartcards or transaction cards, and more particularly to cards having two circuits or circuit modules (or simply "modules") which are physically separate from one another.

BACKGROUND

A smart card (SC), chip card, transaction card, or integrated circuit card (ICC), may be any pocket-sized card that has an embedded integrated circuit. In the main, hereinafter, the discussion will focus on smartcards (or, simply "cards").

Smartcards can provide personal identification, authentication, data storage, and application processing.

Smartcards (SC) typically comprise a card body (CB) and a chip module (CM). The card body may measure 85.60 mm×53.98 mm, and have a thickness of 0.76 mm, according to ID-1 of the ISO/IEC 7810 standard.

The card body (CB) of some smartcards may comprise layers of plastic, laminated together.

The card body (CB) of some smartcards may include a metal layer (ML) in the card body (CB).

The card body (CB) of some smartcards may be made substantially entirely of metal, resulting in a so-called metal card body (MCB).

The chip module (CM) generally comprises a semiconductor chip (IC), which may include a microprocessor and memory.

The chip module (CM) may include a pattern (or array) of contact pads (CP), connected with the semiconductor chip (IC), and exposed on a front surface of the card, to enable an external device (such as a "reader" or POS terminal) with contacts to interact via a physical "contact" interface (ISO 7816) with the semiconductor chip (IC).

When a smartcard (SC) having contact capability is inserted into an external reader, it may be (i) powered by and (ii) communicate with the external device by radio frequency (RF) energy.

The chip module (CM) may comprise a module antenna (MA), which may be connected with semiconductor chip (IC), to enable an external device (such as a "reader" or POS terminal) with its own antenna to interact via a radio frequency (RF) "contactless" interface (ISO 14443 and NFC/ISO 15693) with the semiconductor chip (IC).

A booster antenna (BA) may be embedded in the card body (CB) to enhance the contactless interface. Booster antennas may be described in greater detail hereinbelow.

A coupling frame (CF) may be incorporated into the card body (CB) to enhance the contactless interface. Coupling frames are described in greater detail hereinbelow.

When a smartcard (SC) having contactless capability is brought into close proximity with an external reader it may be (i) powered by and (ii) communicate with the external device by radio frequency (RF) energy.

Some smartcards, generally referred to as "dual interface" or DI smartcards, have both contact and contactless capability.

Powering a device such as a smartcard may be referred to herein as "energy harvesting". A smartcard, which has no battery, and which relies on harvesting energy from an external device, may be referred to as a "passive" card.

Booster Antennas

Generally, a booster antenna (BA) may be formed by embedding a pattern of wire in a plastic layer of the card body(CB). An example of a booster antenna (BA) may be found in U.S. Pat. No. 9,033,250. The booster antenna (BA) may comprise the following components (or portions):

a card antenna (CA) component disposed around a peripheral area of a card body (CB) to interact with the external reader;

a coupler coil (CC) component disposed at an interior location on the card, more particularly at a location of the transponder chip module (TCM), to interact with the module antenna (MA) of the transponder chip module (TCM); and an extension antenna (EA) component extending across an interior area of the card, exclusive of the area occupied by the coupler coil (CC) component, contributing to the inductance of the booster antenna (BA).

FIG. 4I of U.S. Pat. No. 9,033,250 is exemplary, and shows a booster antenna (BA) with card antenna (CA), coupler coil (CC) and extension antenna (EA) components.

The extension antenna EA comprises two coils EA-1 and EA-2 which may be connected in series with one another, as shown. One end of the coil EA-1 is connected with an end of the coupler coil CC, the other end of the coupler coil CC may be a free end. The other end of the coil EA-2 is connected with a first end of the coil EA-2. The other end of the coil EA-2 is connected with an end of the card antenna CA, the other end of the card antenna CA may be a free end. The two coils EA-1 and EA-2 of the extension antenna EA may be laid with the same sense (both clockwise), or with opposite senses (one clockwise, the other counter clockwise). This concept can be applied to more than two extension antennas (EAs).

Reference may be made to the following patents or patent applications having booster antennas:

| Appln.   | Filing Date  | Patent No.              | Publication No. | Publication Date |
|----------|--------------|-------------------------|-----------------|------------------|
| 14020884 | 8 Sep. 2013  | U.S. Pat. No. 9,033,250 | US 20140091149  | 3 Apr. 2014      |
| 14714290 | 16 May 2015  | U.S. Pat. No. 9,449,269 | US 20150356399  | 10 Dec. 2015     |
| 14173815 | 6 Feb. 2014  | U.S. Pat. No. 9,195,932 | US 20150021402  | 22 Jan. 2015     |
| 14564111 | 9 Dec. 2014  | did not issue           | US 20150235122  | 20 Aug. 2015     |
| 14948390 | 23 Nov. 2015 | U.S. Pat. No. 9,633,304 | US 20160118711  | 28 Apr. 2016     |
| 13600140 | 30 Aug. 2012 | U.S. Pat. No. 8,991,712 | US 20130076477  | 28 Mar. 2013     |

FIG. 4I of US 20140091149 shows a booster antenna with a single coupler coil (CC) for coupling with an antenna module (AM) and two extension antenna components (EA-1, EA-2). No modules are associated with the two extension antenna components. See also FIG. 4I of US 20150021402.

Disclaimer

Figure 1:
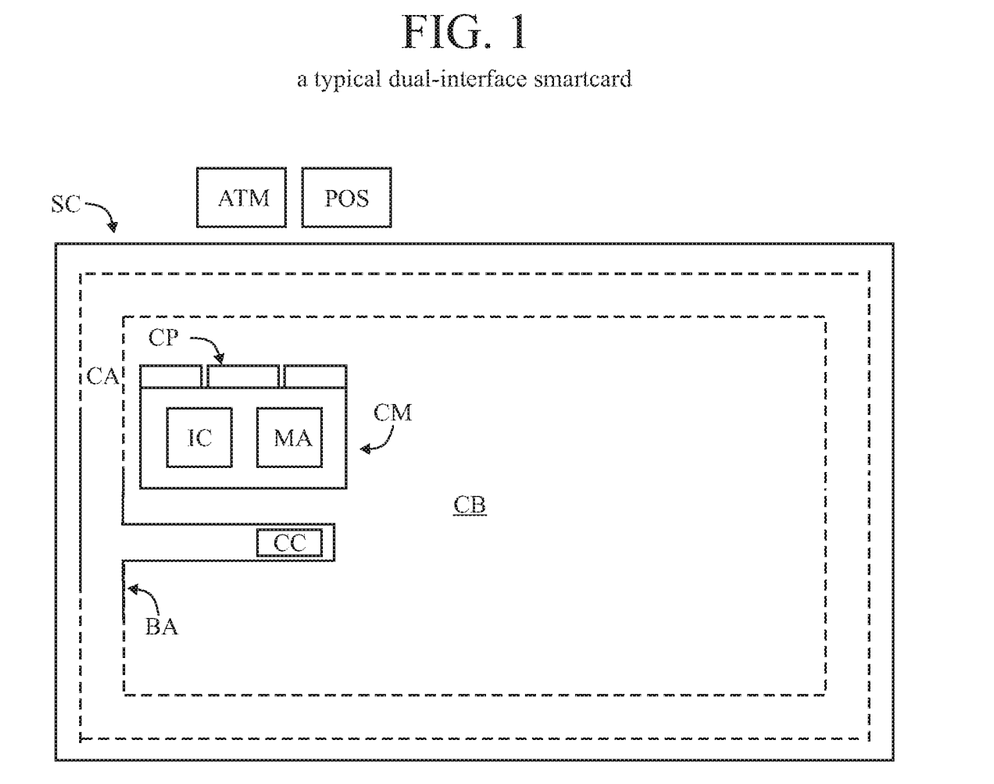
FIG. 1 is a block diagram of a typical dual-interface smartcard of the prior art, having a card body (CB), a chip module (CM) and a booster antenna (BA).
Figure 2:
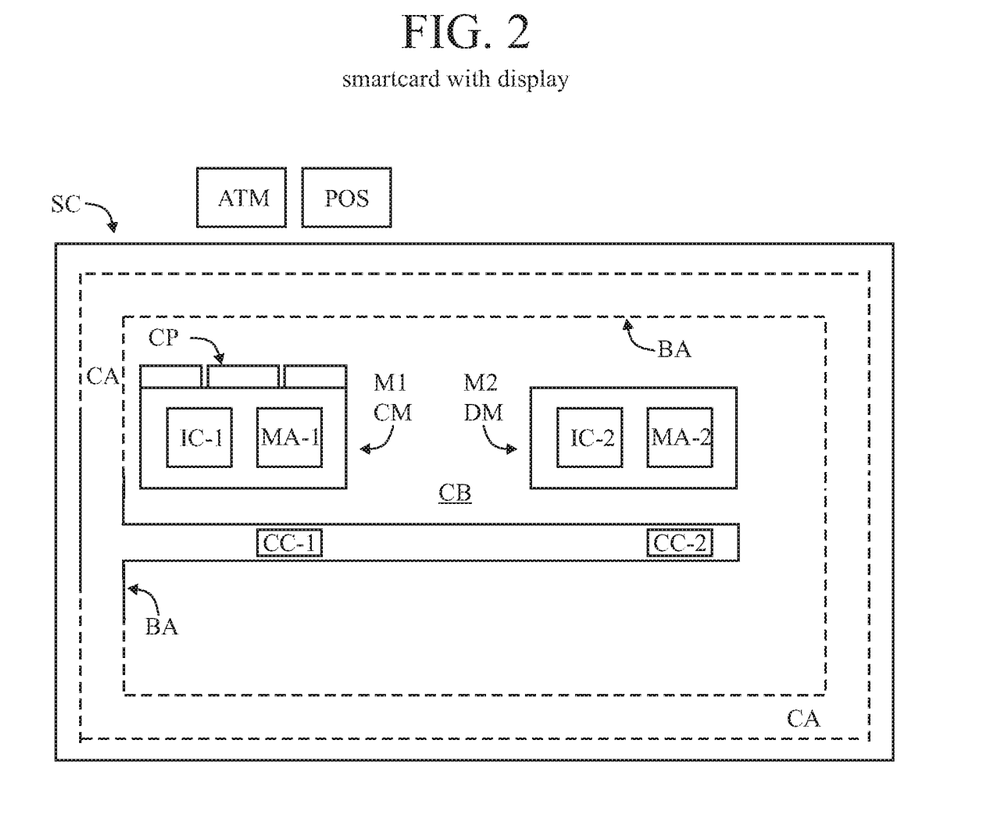
FIG. 2 is a block diagram of a smartcard having a booster antenna comprising a card antenna (CA) component and two coupler coil (CC-1, CC-2) components.
Figure 3:
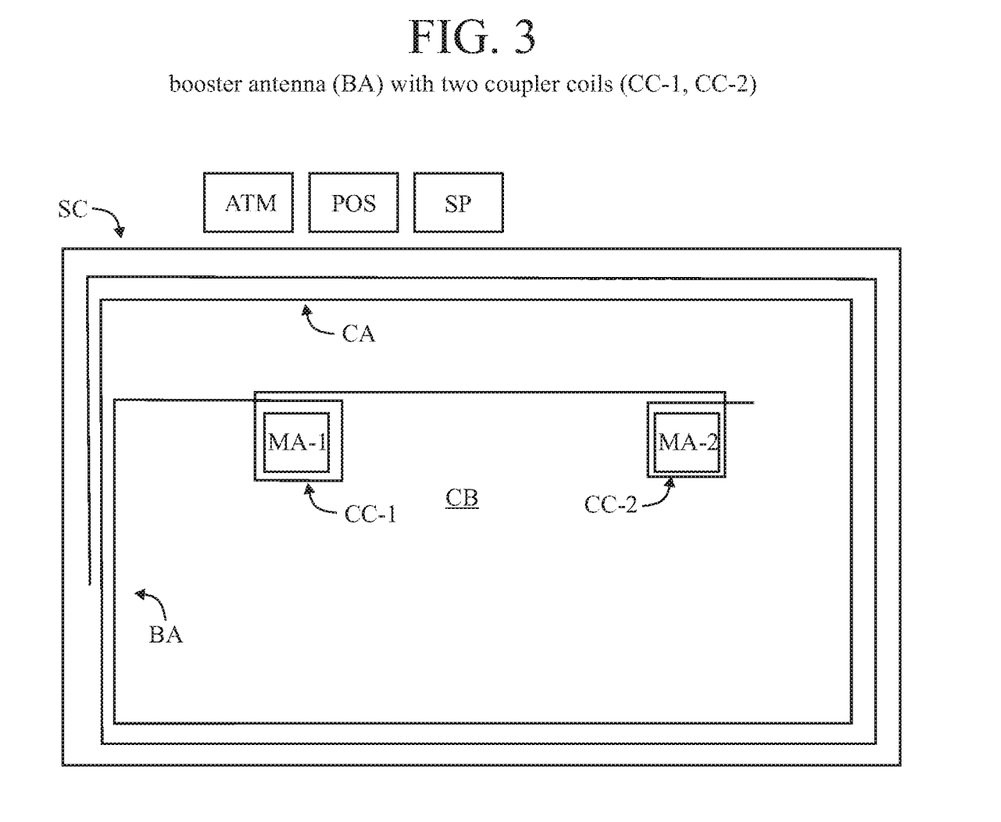
FIG. 3 is another diagram of a smartcard having a booster antenna comprising a card antenna (CA) component and two coupler coil (CC-1, CC-2) components.
Figure 4A:
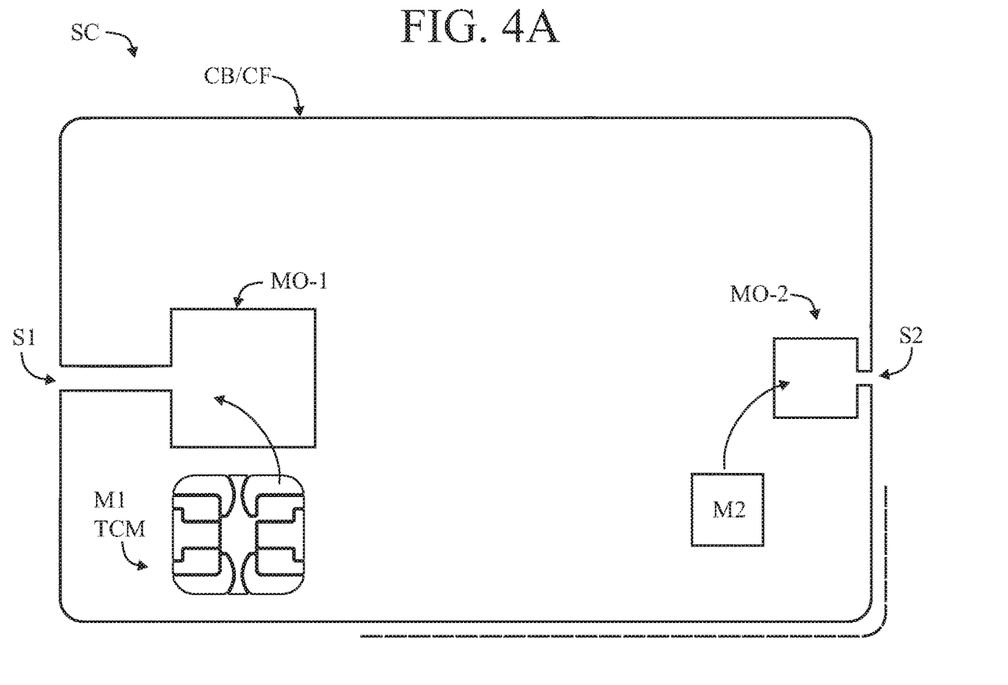
FIG. 4A is a diagram of a smartcard having a coupling frame with two openings, for respective two modules, according to an embodiment of the invention.
Figure 4B:
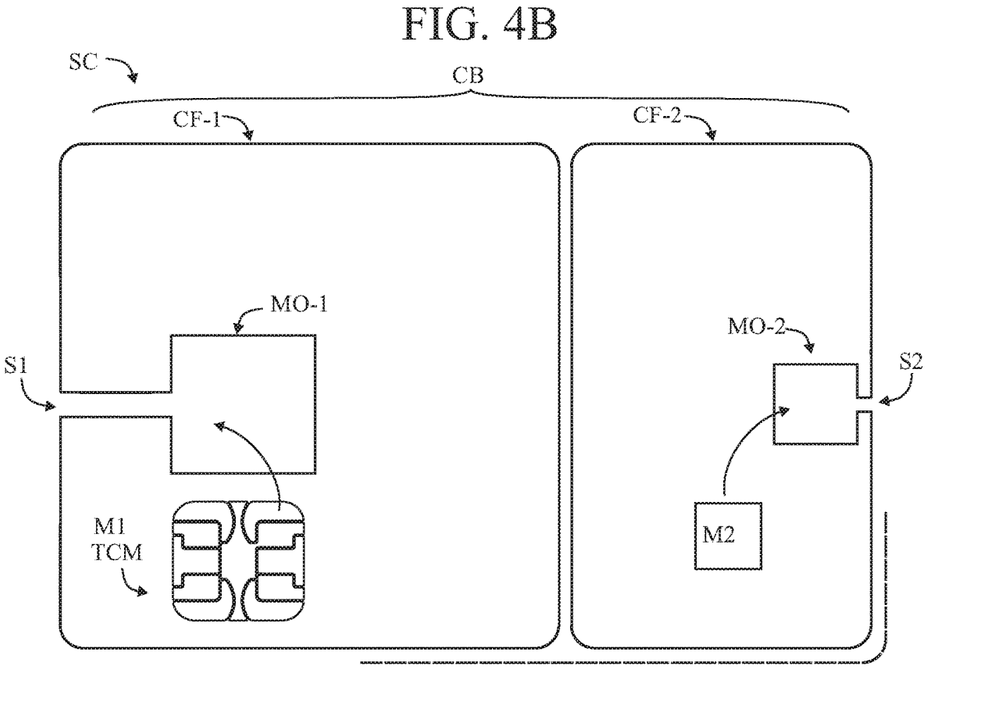
FIG. 4B is a diagram of a smartcard having two coupling frames, each with an opening for a module, according to an embodiment of the invention.
Figure 4C:
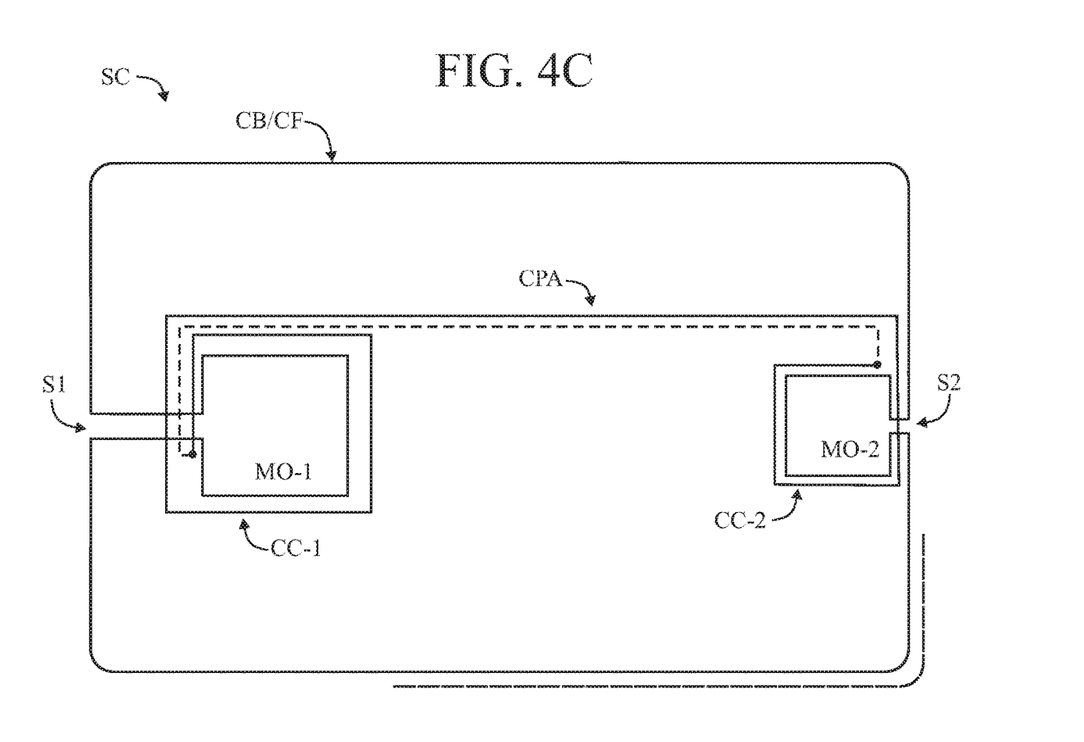
FIG. 4C is a diagram of a smartcard having a coupling frame with two openings, one (or both) of which may be populated with a module, and including a coupling antenna (CPA), according to an embodiment of the invention.

No claim is or will be made in this patent application to a smartcard having a booster antenna (BA) with a card antenna (CA) component disposed around a peripheral area of the card body (CB), such as shown in FIGS. 1, 2, 3. Rather, the claims of this patent application (and eventual patent) are and will be directed to smartcards having coupling frames (CF), such as shown in FIGS. 4A, 4B. Said smartcards having coupling frames may also have coupler coils (CC) incorporated therein, such as shown in FIG. 4C.

Coupling Frames

In some smartcards (SC), the booster antenna (BA) may be eliminated, and replaced by a coupling frame (CF), such as disclosed in U.S. Pat. No. 9,475,086. Generally, a coupling frame (CF) may comprise a metal layer (ML) of a card body (CB), or an entire metal card body (MCB) having an opening (MO) to receive a transponder chip module (TCM), and a discontinuity, typically in the form of a slit (S) extending through the metal layer or card body from the opening to a periphery (outer edge) thereof.

FIG. 2C of U.S. Pat. No. 9,475,086 is exemplary, and shows a transponder chip module (TCM) disposed in the card body (CB) of a smartcard (SC) wherein the coupling frame (CF) overlaps the laser-etched antenna structure (LES) in the transponder chip module (TCM).

FIG. 2D of U.S. Pat. No. 9,475,086 is exemplary, and shows a transponder chip module (TCM) disposed in the card body (CB) of metal smartcard (SC), or metal card (MC), wherein substantially the entire card body (CB) comprises metal, and may be referred to as a metal card body (MCB).

Some additional configurations of coupling frames are disclosed in U.S. Pat. No. 9,697,459.

FIG. 11A of U.S. Pat. No. 9,697,459 shows a smart card (SC), which may have a metal card body (CB) formed with an opening (MO) for a transponder chip module (TCM), a slit (S1) 1130A extending from the opening to an edge (left, as viewed) of the metal care body, turning the card body into a coupling frame (CF) 1120A. The opening MO is at the position prescribed by the ISO standard (near the left edge of the card body (CB).

Another opening (LO) is formed on an opposite side of the metal card body and also has a slit (S2) 1130B extending from the opening to the edge (right, as viewed) of the card body/coupling frame (CB/CF). An LED may be disposed in the opening (LO) and connected to the card body/coupling frame (CB/CF) across the slit (S2).

The dashed line around the coupling frame CF (lower right corner only) is intended to indicate that the coupling frame may be disposed in a plastic card body CB. Alternatively, as discussed herein, a metal card body MCB may be modified to perform as a coupling frame.

This arrangement provides a transponder chip module (TCM) with an LED on opposite sides (left-right) of a card body of a smart card, which may be a metal smart card. In this example, a single coupling frame CF may have enough power to illuminate the LED while still providing enough power to activate and operate the RFID chip in the transponder chip module (TCM).

FIG. 11B of U.S. Pat. No. 9,697,459 shows a smart card (SC) having two coupling frames, and a card body (CB) which may be a metal card body (MCB) comprising a first coupling frame (CF-1) 1120A on the left (as viewed) side of the card body and a second coupling frame (CF-2) 1120B on the right (as viewed) of the card body. The two coupling frames (CF-1, CF-2) may be electrically isolated from one another. A first opening (MO) for a transponder chip module (TCM) may be formed in the left coupling frame (CF-1), with a slit (S1) 1130A extending from the opening (MO) to the left (as viewed) edge of the metal card body, turning the card body into a coupling frame CF. The opening MO may be located at the position prescribed by the ISO standard (near the left edge of the card body).

Another opening (LO) is formed on an opposite side of the metal card body, in the second coupling frame (CF-2) 1120B portion thereof, and similarly has a slit (S2) 1130B extending from the opening (LO) to the right edge (as viewed) of the card body/coupling frame. An LED or LED module (an LED with additional components) may be disposed in the opening (LO) and connected to the coupling frame (CF-2) across the slit (S2).

The first coupling frame CF-1 may have a larger surface area than the second coupling frame CF-2, and may be substantially coplanar with the second coupling frame CF-2.

U.S. Pat. No. 9,390,364 (2016 Jul. 12; Finn) discloses a transponder chip module (TCM) comprises an RFID chip (CM, IC), optionally contact pads (CP), a module antenna (MA), and a coupling frame (CF), all on a common substrate or module tape (MT). The coupling frame (CF, 320A) may be in the form of a ring, having an inner edge (IE), an outer edge IE, 324 ) and a central opening (OP), disposed closely adjacent to and surrounding the module antenna (MA). A slit (S) may extend from the inner edge (IE) to the outer edge (OE) of the coupling frame (CF) so that the coupling frame (CF) is "open loop". See also U.S. Ser. No. 15/197,795 filed 30 Jun. 2016 (US 2016/0365644).

FIGS. 6C, D show a coupling frame (CF) with coupler coil (CC) disposed in a card body (CB) of a smart card (SC).

The coupler coil (CC) may be in the form of a flat, rectangular spiral, having two ends. Some variations may include: the coupler coil (CC) may be left unconnected, or floating (both of its ends being "free ends") the two ends of the coupler coil (CC) may be connected with one another, such as via a resistive load (or a jumper) one of the two ends of the coupler coil (CC) may be connected with the coupling frame (CF) in the card body (CB).

As best viewed in FIG. 6D, when the coupling frame (CF) is disposed in a layer of the card body (CB), it may be not be substantially coplanar with the transponder chip module (TCM), but rather may be offset therefrom by intervening layers (including, for example, adhesive) and there may be a space of approximately 100-200 µm between the bottom of the transponder chip module (TCM), particularly its planar antenna (PA), and the plane of the coupling frame (CF). However, the coupler coil (CC) and planar antenna (PA) of the transponder chip module (TCM) may couple very well.

FIG. 6E shows a card body (CB) of a smart card (SC) comprising a coupling frame (CF) having a slit (S) and also having one or more coupler coils (CC) formed therein.

U.S. Pat. No. 9,390,364 discloses, in FIG. 6E, a coupling frame (CF) in a card body (CB) of a smart card (SC). The coupling frame has an opening (OP) for a transponder chip module (TCM) and two additional openings in the coupling frame. The additional openings have coils, referred to as "coupler coils" disposed therein. These so-called "coupler coils" do not perform the function of traditional coupler coils (CC) of a booster antenna (BA), and there is no discussion in the '364 Patent of whether the coils are connected with anything, or with one another. There is no discussion of disposing modules in the additional openings.

Reference may be made to the following patents which disclose some examples of coupling frames:

U.S. Pat. No. 9,475,086 (25 Oct. 2016; Finn et al.)
U.S. Pat. No. 9,798,968 (24 Oct. 2017; Finn et al.)
U.S. Pat. No. 9,390,364 (12 Jul. 2016; Finn et al.)
U.S. Pat. No. 9,812,782 (7 Nov. 2017; Finn et al.)
U.S. Pat. No. 10,248,902 (2 Apr. 2019; Finn et al.)
U.S. Pat. No. 9,697,459 (4 Jul. 2017; Finn et al.)
U.S. Pat. No. 9,836,684 (5 Dec. 2017; Finn et al.)
US 2019/0114526 (18 Apr. 2019; Finn et al.)
U.S. Pat. No. 10,193,211 (29 Jan. 2019; Finn et al.)
U.S. Pat. No. 10,518,518 (31 Dec. 2019; Finn et al.)

Smartcards with Display Capability

Some smartcards have a battery, and include a display for presenting information (such as a security code, or one-time passwords) to the user. Cards having their own, internal power source may be referred to as "active" cards.

Some smartcards have a display, but use energy harvesting, rather than a battery, to power the display. See, for example, WO 2017198842 (ASK), incorporated by reference herein. The display may be e-paper, which requires power only for changing the information on the display.

WO 2017198842 describes an interaction between a smartcard and a smartphone wherein, when the smartcard is brought into proximity with the smartphone, (i) the smartcard is powered "wirelessly" by the smartphone, and (ii) a code generated by the smartcard is displayed on a display of the smartcard. As described therein, there is a physical "wired" (or "hardwired") connection between a first circuit such as a chip (120) or a conversion module (130), and a second circuit including a display module (140). FIG. 6 therein shows an electrical connecting line (3) and a ground line (4) extending between the first circuit (120/130) and the second circuit (140).

In practice, making hardwired connections between distinct electronic components (such as circuits or modules) within the smartcard may be difficult to achieve (from a manufacturing standpoint), and may create a reliability issue. Repeated flexing of the card can compromise the connections. Consider, for example U.S. Pat. No. 7,980,477 (19 Jul. 2011; Finn) wherein, in order to effect hardwired connections between ends of an antenna in the card body and corresponding terminals of a chip module (IC), end portions of the antenna wire are formed with squiggles or meanders forming contact areas and silicon cushions are disposed under the contact areas.

SUMMARY

It is a general object of the invention to eliminate (or obviate the need for) a hardwired connection between two or more distinct electronic circuits (or modules) within the smartcard which are physically separated from one another, and to effect the connection(s) with a wireless connection between the modules. The wireless connection may convey power and/or data between the modules. The circuits or modules may be "active", in that they require power to operate, as may be distinguished from purely passive components such as a capacitor.

In other words, a general object of the invention is to eliminate the need for a wired connection between two modules in a smartcard, such as is present in the aforementioned WO 2017198842.

When there are two distinct circuits (or separate modules) that need to communicate with one another, this may involve, at a minimum, passing signals (including data) between the two modules, both of which need to be powered. Generally, there are some possibilities, such as:

At least one of the circuits may harvest energy from an external source (such as a contactless reader, or a smartphone).

Both of the circuits may harvest energy from the external source.

One (a first) circuit may harvest energy from the external source, and the other (a second) circuit may be powered by the first circuit.

As described above, the booster antenna (BA) and module antenna (MA) are "wirelessly", connected (in communication) with one another via RF, rather than hardwired to each other. As used herein, "wireless" refers to RF-coupling, generally, and "contactless" refers to a specific protocol, such as ISO 14443 and NFC/ISO 15693.

According to the invention, generally, a wireless connection may be established between two electronic modules (M1, M2) disposed in a smartcard so that the two modules may communicate (signals, data) with each other.

The wireless connection may be implemented by disposing the two modules (M1, M2) in respective two module openings (MO-1, MO-2) in a coupling frame (CF) in the card. The coupling frame may be implemented as at least one metal layer, or as an entire metal card body, having the two module openings. In either case, the metal layer(s) or metal card body may be substantially the same overall size as the card—for example, ID-1 format. There may be a single coupling frame, as may be shown in FIG. 4A, or there may be a segmented coupling frame implemented as two coupling frames disposed side-by-side, as may be shown in FIG. 4B.

The wireless connection may be augmented by incorporating a so-called "coupling antenna" (CPA) having two coupler coils (CC-1, CC-2) into the card. The two coupler coils (CC-1, CC-2) may be connected with one another and disposed close to the two modules (MO-1, MO-2), respectively, as may be shown in FIG. 4C.

The coupling antenna (CPA) may comprise first and second coupler coils (CC-1, CC-2) associated with the two modules (M1, M2); and the first and second coupler coils may be connected with one another.

In addition to passing signals between the two modules (MO-1, MO-2), the coupling frame (CF), by itself or with the coupling antenna (CPA), may also serve to harvest energy from an external device such as a card reader, POS terminal, or a smartphone.

According to some embodiments (examples) of the invention, a smartcard may comprise: a metal layer (ML) or metal card body (MCB) having a first opening (MO-1) for a first module (M1) and a second opening (MO-2) for a second module (M2); wherein: the two modules are physically separated from one another in the card body, yet need to communicate with one another, and both of the two modules require power to operate; and a wireless RF connection is established between the two modules. There is no hardwire connection between the first and second modules.

The first module may comprise a chip module (CM) or transponder chip module (TCM); and the second module may comprise a display module (DM). The chip module (CM) may be a dual-interface module having contact pads (CP). The second module (M2) may be an electronic module or device other than a display module (DM).

The two modules may be physically separated from one another in the card body, yet need to communicate with one another, and both of the two modules require power to operate. A wireless (RF) connection is established between the first and second modules, for data and power transfer.

As shown in FIGS. 2 and 3, the first module (M1) may comprise a first module antenna (MA-1), and the second module (M2) may comprise a second module antenna (MA-2). Referring to FIG. 4C, the first coupler coil (CC-1) of the coupling antenna (CPA) may be disposed in proximity with the first module antenna (MA-1); and the second coupler coil (CC-2) may be disposed in proximity with the second module antenna (MA-2). In contrast with the booster antenna (BA) shown in FIGS. 2 and 3, the coupling antenna (CPA) does not include a card antenna (CA) component disposed around the periphery of the card, and is therefore distinguishable from a booster antenna.

At least one coupling frame (CF) may be disposed in the card body. The first module (M1) may be disposed in a first opening (MO-1) in the card body; and the second module (M2) may be disposed in a second opening (MO-2) in the card body.

A first slit (S1) may extend from the first opening (MO-1) to an edge of the metal layer or metal card body; and a second slit (S2) may extend from the second opening (MO-2) to an edge of the metal layer or metal card body.

As disclosed herein:
The first module (M1), which may be a transponder chip module (TCM, or CM), may comprise a first module antenna (MA-1).
The second module (M2), which may be a display module (DM), may comprise a second module antenna (MA-2). A display module is disclosed in WO 2017198842.
The coupler coil (CC-1) may be disposed in proximity with the module antenna (MA-1).
The coupler coil (CC-2) may be disposed in proximity with the module antenna (MA-2).

According to some embodiments (examples) of the invention, a method of providing data to a second module (M2) of a smartcard (SC) may comprise: from a first module (M1, CM, TCM) of the smartcard, communicating wirelessly with the second module (M2). The first module (M1) may comprise a transponder chip module (TCM, or CM). The second module (M2) may comprise a display module (DM).

The first module (M1, CM, TCM) and second module (M2, DM) may each (both) harvest energy from an external device. The external device may be an ATM or a POS terminal or a contactless card reader, or a smartphone (SP). Only one of the modules may harvest energy from the external device, and provide energy to the other module. A third, energy-harvesting module may harvest energy from the external device and provide it to one or both of the two modules (CM, DM). Such a third module (M3) for energy harvesting may be incorporated into one or both of the other modules (M1, M2), or it may be separate from the other two modules.

In their various embodiments, the invention(s) described herein may relate to industrial and commercial industries, such RFID applications, payment smartcards, electronic passports, identity cards, access control cards, payment objects, wearable devices, smart jewelry and the like.

Other objects, features and advantages of the invention(s) disclosed herein, and their various embodiments, may become apparent in light of the descriptions of some exemplary embodiments that follows.

BRIEF DESCRIPTION OF THE DRAWINGS

Reference will be made in detail to embodiments of the disclosure, non-limiting examples of which may be illustrated in the accompanying drawing figures (FIGS.). Some figures may be in the form of diagrams. Some elements in the figures may be exaggerated, others may be omitted, for illustrative clarity.

Any text (legends, notes, reference numerals and the like) appearing on the drawings are incorporated by reference herein.

Some elements may be referred to with letters ("AM", "BA", "CB", "CCM", "CM", "MA", "MT", "PA", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and variations thereof, and may be collectively (all of them at once) or individually (one at a time) referred to simply by the numeral ("310").

The figures presented herein may show different embodiments of RFID devices, such as smart cards or payment objects such as wearable devices. Some of the drawings may omit components such as the transponder chip module or module antenna, for illustrative clarity. Some of the figures may show only components of an RFID device, such as coupling frames.

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Some processes may be presented and described in a series (sequence) of steps. It should be understood that the sequence of steps is exemplary, and that the steps may be performed in a different order than presented, some steps which are described may be omitted, and some additional steps may be omitted from the sequence and may be described elsewhere.

Reference may be made to disclosures of prior patents, publications and applications. Some text and drawings from those sources may be presented herein, but may be modified, edited or commented to blend more smoothly with the disclosure of the present application. Citation or identification of any reference should not be construed as an admission that such reference is available as prior art to the disclosure.

FIG. 1 shows a smartcard (SC) comprising a card body (CB) and a chip module (CM). The chip module (CM) comprises an integrated circuit (or semiconductor) chip (IC) and a module antenna (MA). The module antenna (MA) may be disposed around a peripheral area of the chip module (CM).

The chip module (CM) may have contact pads (CP) disposed on its front surface. Typically, there are 6 or 8 contact pads.

When the chip module (CM) is disposed in the card body (CB), the front surface and corresponding contact pads (CP) of the chip module (CM) may be coincident with the front surface of the card body (CB). The chip (IC) may be used for a financial payment application, identification or mass transit. This is sufficient to effect a "contact" interface (ISO 7816) between the smart card (SC) and contacts (not shown) of an external device, such as an automated teller machine (ATM) terminal.

The chip (IC) may comprise (not shown) various circuits and elements, such as a microprocessor and memory. The memory may comprise either or both of volatile and non-volatile memory.

The chip module (CM), comprising integrated circuit chip (IC) and module antenna (MA), may be referred to as an antenna module (AM) or as a transponder chip module (TCM). See, for example U.S. Pat. Nos. 9,475,086, 9,798, 968, 9,390,364, 9,697,459.

The smartcard may also comprise a booster antenna (BA). The booster antenna (BA) may comprise a card antenna (CA) component (shown in dashed lines) extending around a periphery of the card body (CB), for "contactless" coupling (ISO 14443 and NFC/ISO 15693) with an antenna (not shown) of an external device, such as a point-of-sale (POS) terminal. The booster antenna (BA) may further comprise a coupler coil (CC) component disposed at the location in the card body (CB) which is closely adjacent, including surrounding the chip module (CM), for coupling with the module antenna (MA) of the chip module (CM).

The proximity of the coupler coil (CC) with the module antenna (MA) allows the chip module to harvest energy from the external device (or reader), such as the aforementioned POS terminal, and also allows for data to be passed back-and-forth between the chip module (CM) and the external device.

The smartcard (SC) described in FIG. 1 is representative of a typical "dual interface" card which has both "contact" and "contactless" interfaces. Such a card may also have numbers (which may be embossed) on its front surface numbers, other information (user name, bank name, hologram, etc.) visible on its front surface, and a magnetic stripe and signature panel (not shown) disposed on its back surface. FIG. 1 is representative of prior art.

As discussed in WO 2017198842, a smartcard may be provided with a display module (140) which may, for example, be an e-paper type screen which requires power only when the display changes.

FIG. 2 shows a smartcard (SC) comprising a first electronic module (M1) which may be a chip module (CM) or a transponder chip module (TCM) having an integrated circuit chip (IC-1) and a module antenna (MA-1). A transponder chip module (TCM) may have contact pads (CP) on its front surface, which may be substantially coincident (or flush) with the front surface of the card.

The first module (M1) may be other than a transponder chip module. An electronic module (M1) with an integrated circuit chip (IC-1) and a module antenna (MA-1) may be relevant to the embodiments shown in FIGS. 4A-C.

The smartcard of FIG. 2 also includes a booster antenna (BA), comparable to the booster antenna shown in FIG. 1—namely, the booster antenna (BA) has a card antenna (CA) component disposed around a periphery of the card, and at least one coupler coil (CC) component.

The smartcard (SC) further comprises a second electronic module (M2), which may be a display module (DM) disposed in the card body (CB), and having a surface which may be substantially coincident with the front or rear surface of the card body (CB), for displaying information to the card-holder (user). The information which is displayed may include a card verification value (CVV) or one-time password (OTP) or other information which may be relevant to user of the card for initiating a transaction.

The invention is not limited to a second module which is a display module. The second module could be, for example, a fingerprint sensor, or simply an LED connected with a pickup antenna comparable to the module antenna of the chip module (CM). (This may be contrasted with U.S. Pat. No. 9,475,086, FIG. 7A, which shows an LED connected to ends of a coupling frame.)

The first and second electronic modules (M1, M2) are physically separated from one another in the card body of the smart card. Generally, the two modules may need to communicate with one another, and both modules may require power to operate. Communication may be effected without any hard-wire connection between the modules. The modules may be powered inductively, without a direct electrical connection to other components of the smart card.

The second module (M2) is physically separate (spaced-apart) and distinct from the first module (M1), is disposed in a different area of the card body than the first module (M1), and is not connected by wires to the first module (M1). This may be relevant to the embodiments shown in FIGS. 4A-C.

The booster antenna (BA) shown in FIG. 2 is different than the booster antenna shown in FIG. 1, in that it may comprise two coupler coil (CC-1, CC-2) components, which may be spaced-apart from one another.

The coupler coil component CC-1 may be disposed at a location in the card body (CB) aligned with the first module (M1, CM, TCM). The coupler coil component CC-2 may be disposed at a location in the card body (CB) aligned with the second module (M2, DM). See also FIG. 3.

The first module (M1, CM, TCM) may comprise a module antenna (MA-1) for coupling with a first of the coupler coils (CC-1), for harvesting energy, as was described with respect to FIG. 1, from an external device such as a POS terminal. The module antenna (MA-1) and coupler coil (CC-1) may be disposed in close proximity (such as aligned) with one another. The module antenna (MA-1) may be disposed around a peripheral area of the first module (M1, CM, TCM).

The second module (M2, DM) may comprise a module antenna (MA-2) for coupling with a second of the coupler coils (CC-2), for harvesting energy from the exemplary POS terminal. The module antenna (MA-2) and coupler coil (CC-2) may be disposed in close proximity (such as aligned or overlapping) with one another. The module antenna (MA-2) may be disposed around a peripheral area of the second module (M2, DM).

The first module (M1, CM, TCM) may comprise an integrated circuit chip (IC-1) for managing communications with the external device (such as POS terminal), for managing communication with the second module (M2, DM), and (optionally) for generating a CVV code. The chip module (CM, M1) may further comprise a power module, or energy harvesting circuit (not shown) for harvesting energy from the external device (such as POS terminal). The energy harvesting circuit may be incorporated into the integrated circuit chip (IC-1).

The second module (M2, DM) may comprise an integrated circuit chip (IC-2) for managing communication with the first module (M1, CM, TCM). The second module (M2, DM) may further comprise a power module, or energy harvesting circuit (not shown) for harvesting energy from the external device (such as POS terminal). The energy harvesting circuit may be incorporated into the integrated circuit chip (IC-2).

A simple energy harvesting circuit may comprise a bridge rectifier (four diodes). An energy harvesting circuit may be incorporated into each of the chip module (CM, M1) and the display module (DM, M2).

As shown in FIG. 2, the first module (M1) and the second module (M2) may communicate with one another, via their respective module antennas (MA-1, MA-2), via the intermediary of the booster antenna (BA), particularly the coupling coil (CC-1, CC-2) components thereof.

Additionally, energy may be harvested by each of the first module (M1) and second module (M2) via the booster antenna (BA) and respective coupler coils (CC-1, CC-2). Both of the modules (M1, M2) may harvest energy from an external source (POS terminal). One of the two modules may harvest energy, and provide energy to the other module, in which case only one of the modules would need an energy harvesting circuit. A third, energy-harvesting module (not shown) may harvest energy from an external device, and provide the energy to the other two modules (M1, M2), and the booster antenna may have a third coupler coil (CC-3) associated therewith.

FIG. 3 is generally the same as FIG. 2, and shows an arrangement of a booster antenna (BA) in a card body (CB), wherein the booster antenna (BA) comprises a card antenna (CA) component, a first coupler coil (CC-1) component disposed at a location of the first module (M1), and a second coupler coil (CC-2) component disposed at a location of the second module (M2). The diagram is greatly simplified, showing only a few turns (coils) of wire for each of the booster antenna components (CA, CC-1, CC-2). The two coupler coils (CC-1, CC-2) may be connected with one another, as illustrated. The two coupler coils may be wound with the same or opposite sense with respect to one another.

The pattern for the booster antenna (BA) and its components (or portions CA, CC-1, CC-2) may be formed other than by embedding wire, such as by a subtractive (etching) or additive (depositing) process.

The card antenna (CA) component which is an important component of the booster antenna (BA) may be disposed around the periphery of the card body (CB), then the booster antenna (BA) may continue to the interior of the card body (CB) to form a coupler coil (CC-1) component at the location of the module antenna (MA-1) of the chip module (CM, M1), then the booster antenna (BA) may continue across the card body (CB) to form a coupler coil (CC-2) component at the location of the module antenna (MA-2) of the display module (DM, M2).

A coupler coil (CC-1, CC-2) may be approximately coplanar with its respective module antenna (MA-1, MA-2), surrounding the module antenna (so to speak). This may be relevant to the embodiments shown in FIGS. 4A-C.

Alternatively, the coupler coils (CC-1, CC-2) may be arranged above or below their respective module antenna (MA-1, MA-2) so that at least a portion of each coupler coil (CC-1, CC-2) may overlap at least a portion of its respective module antenna (MA-1, MA-2). The coupler coil (CC-1) may extend underneath (behind) the chip module (CM, M1) so that it overlaps (including completely) the module antenna (MA-1). The coupler coil (CC-2) may extend over (above) the second module (M2) so that it overlaps (including completely) the module antenna (MA-2). This may be relevant to the embodiments shown in FIGS. 4A-C.

As mentioned above, the module antennas (MA-1, MA-2) may be disposed around a peripheral area of their respective chip module (CM, M1) and display module (DM, M2). And, the coupler coils (CC-1, CC-2) may be disposed in close proximity with their respective module antennas (MA-1, MA-2) including aligned directly over or under their respective module antennas (MA-1, MA-2). This may be relevant to the embodiments shown in FIGS. 4A-C.

The windings of the booster antenna (BA) or component elements thereof may overlap the windings of a the module antennas (MA-1, MA-2) to enhance inductive coupling, including energy transfer, and also to support the transfer of data.

In FIG. 3, one end of the card antenna (CA) component is shown as a free end (not connected with anything), and one end of the coupler coil (CC-2) is shown as a free end. These two free ends could be connected with one another, directly, or via an electronic component such as a capacitor. Other arrangements and connections are possible.

The booster antenna (BA) described herein, having coupler coils disposed at the location of two module openings may be contrasted with the teachings of U.S. Pat. No. 9,390,364, particularly with reference to FIGS. 6C, D, E, F therein.

- The booster antenna disclosed herein has two coupler coils (CC-1, CC-2) associated with respective two module openings (MO-1, MO-2), at least one of, including both of which may have modules with module antennas disposed therein, and the two coupler coils are connected with one another. The booster antenna (BA) also has a card antenna (CA) component extending around the periphery of the card body (CB).
- In FIGS. 6E, F of U.S. Pat. No. 9,390,364, two separate and distinct coils are shown disposed in two openings in a coupling frame. The two coils are not connected with each other.
- The booster antenna disclosed herein has two (or more) coupler coils which are connected with one another. Electronic modules (M1, M2) are disposed in openings in the card body, at the locations of the two coupler coils (CC-1, CC-2).

FIG. 3 also shows that a smartphone (SP) may be used as an external device to power (as well as communicate with) the smartcard (SC), and its respective first, chip module (CM, M1) and second, display module (DM, M2). The use of a smartphone to power a smartcard may be disclosed in WO 2017198842. This may be relevant to the embodiments shown in FIGS. 4A-C.

A third, energy-harvesting module (not shown) may harvest energy from the external device and provide it to one or both of the two modules (CM, DM).

As discussed in WO 2017198842, the information displayed by the display module (140) may comprise data, such as a card verification value (CVV), which may be updated (changed) on a per-transaction (per-use) basis. The CVV may be generated by the chip module (CM) within the card as a result of "pairing" of the card and a smartphone. In WO 2017198842, the display module (140) is connected by wires (3, 4) to other circuits (120, 130) in the smartcard.

In contrast with WO 2017198842, the second module (DM, M2) is not wired to other circuits (or modules) in the card. Rather, the chip module (CM, M1) may communicate data (such as an updated CVV) wirelessly with the second module (DM, M2) via the respective module antennas (MA-1, MA-2) which are both inductively coupled with the respective coupler coils (CC-1, CC-2) of the booster antenna (BA).

A super capacitor may be integrated into the card construction as an energy storage device.

The smartphone may run an app to synchronize a time stamp with a central server. Compare WO 2017198842.

The techniques (methods and apparatus) disclosed herein may be applied in the context of pairing with a smartphone to generate a dynamic CVV, and communicating with a bank computer server 600, such as disclosed in the aforementioned WO 2017198842 (ASK), resulting in a system for effecting banking transactions. Other applications are possible, such as cards generating one-time passwords for online banking. If the card does not have its own battery, it can be powered by a smartphone running a simple app which may (for example) simply turn on the NFC field in the phone. This may be relevant to the embodiments shown in FIGS. 4A-C.

A transponder chip module (TCM) may be disposed in the first module opening (MO-1). The second module opening MO-2 may be left empty, or a passive component (such as an LED) may be disposed in the second module opening (MO-2). The passive component may be connected to the second coupler coil (CC-2), or it may have its own antenna (akin the MA-2) to receive power from the second coupler coil (CC-2). This may be relevant to the embodiments shown in FIGS. 4A-C.

When there is no module disposed in the second module opening (MO-2), the second coupler coil (CC-2) may nevertheless be used to increase energy harvesting. Since there are not two modules, there need not be any data transfer therebetween, only data transfer between (for example) the first, transponder chip module (M1, CM, TCM) and an external reader (such as POS terminal). This may be relevant to the embodiments shown in FIGS. 4A-C.

Wirelessly Connecting Modules, without a Booster Antenna

U.S. Pat. No. 9,475,086, discussed above, discloses metal layers (ML) in a card body (CB), and metal card bodies (MCB) having slits (S) to allow the metal layer or metal card body to act as a coupling frame (CF). The coupling frame (CF) may substitute for the booster antenna (BA) in a smartcard, including a dual-interface metal card, and may be adapted to drive a the chip module (CM, M1) and the display module (DM, M2) in a manner comparable to that of a booster antenna (see FIG. 2). Data may also be transferred using the metal (layer or card body).

FIG. 4A shows, in the manner of FIG. 11A of U.S. Pat. No. 9,697,459, a single coupling frame having a first opening MO-1 for accepting a first module M1, and a second opening MO-2 for accepting a second module M2.

FIG. 4A shows a smart card (SC), which may have a metal layer (ML) which may be a metal card body (CB, MCB) formed with an opening (MO-1) for a transponder chip module (TCM, CM, M1), a slit (S1) extending from the opening to an edge (left, as viewed) of the metal card body, turning the card body into a coupling frame (CF). The opening MO-1 may be at the position prescribed by the ISO standard (near the left edge of the card body (CB) for the transponder chip module (TCM).

Another opening (MO-2) is formed on an opposite (right) side of the metal layer (ML) or metal card body (MCB) and has a slit (S2) extending from the opening to the edge (right, as viewed) of the card body/coupling frame (CB/CF). A display module (DM, M2) may be disposed in the opening (MO-2).

The dashed line around the coupling frame CF (lower right corner only) is intended to indicate that the coupling frame (CF) may be a metal layer (ML), or metal slug, disposed in a plastic card body (CB). Reference US 20150021403 (particularly FIG. 9).

This arrangement provides a smartcard (SC) with a metal layer (ML) or metal card body (MCB) powering and supporting communication between two distinct modules (M1, M2).

FIG. 4B shows, in the manner of FIG. 11B of U.S. Pat. No. 9,697,459, a first coupling frame CF-1 having a first opening MO-1 for accepting a first module M1, and second coupling frame CF-2 having a second opening MO-2 for accepting a second module M2.

FIG. 4B shows a smart card (SC) having two coupling frames, and a card body (CB) which may have at least one metal layer (ML) modified to provide a first coupling frame (CF-1) on the left (as viewed) side of the card body (CB) and a second coupling frame (CF-2) on the right (as viewed) of the card body (CB).

A first opening (MO-1) for a transponder chip module (TCM, M1) may be formed in the left coupling frame (CF-1), with a slit (S1) extending from the opening (MO-1) to the left (as viewed) edge of the metal card body. The opening MO-1 may be located at the position prescribed by the ISO standard (near the left edge of the card body).

Another opening (MO-2) is formed on an opposite (right) side of the metal card body, in the second coupling frame (CF-2), and similarly has a slit (S2) extending from the opening (MO-2) to the right edge (as viewed) of the card body/coupling frame. A display module (DM, M2) may be disposed in the opening (MO-2).

The two coupling frames (CF-1, CF-2) may be formed of a single metal layer (ML), and may be substantially coplanar with one another. The single metal layer maybe a metal card body with a recess for receiving a ceramic insert. Reference U.S. Pat. No. 9,697,459 (particularly FIG. 3D).

The two coupling frames (CF-1, CF-2) may be formed of two metal layers (ML-1, ML-2) which overly (overlay) each other, and are electrically isolated from one another. Reference U.S. Pat. No. 9,697,459 (particularly FIG. 9A).

The first coupling frame (CF-1) may have a larger surface area than the second coupling frame (CF-2). The two coupling frames (CF-1 and CF-2) may be considered to be two portions of a single, split coupling frame.

FIG. 4C shows a metal layer (ML) with two module openings (MO-1, MO-2) and respective two slits (S1, S2). Compare FIG. 4A.

FIG. 4C additionally shows a coupling antenna (CPA) which may similar to the booster antenna (BA) shown in FIG. 3, but without the peripheral card antenna (CA) component. In other words, the coupling antenna (CPA) is shown having two coupler coils (CC-1) and (CC-2) overlapping, within or in close proximity to respective two module openings (MO-1, MO-2) of the card body (CB) and coupling frame (CF). The two coupler coils (CC-1, CC-2) may both have free ends (●). Alternatively, the ends of the two coupler coils could be connected with one another, as illustrated by the dashed line. The two coupler coils (CC-1, CC-2) are associated with and disposed close to the two modules (M1, M2), respectively, within an interior area of the card. The windings of the coupler coils (CC-1, CC-2) may overlap the windings of a the respective module antennas (MA-1, MA-2) to enhance inductive coupling, including energy transfer, and also to support the transfer of data. Again, there is no peripheral card antenna (CA) component, hence the coupling antenna (CPA) is differentiated from, and should not be confused with or considered to be a booster antenna (BA).

The coupling antenna (CPA) may be formed other than by embedding wire, such as by etching (subtractive process) a conductive layer, or depositing (additive process) a conductive pattern.

It may be beneficial to incorporate a layer of ferrite shielding material between the coupling antenna (CPA) and the coupling frame (CF).

It may be possible to incorporate the coupling antenna (CPA) into a card body of a smart card, without having a coupling frame (CF).

A transponder chip module (TCM) may be disposed in the first module opening (MO-1). The second module opening MO-2 may be left empty, or a circuit, a module, or a component (such as an LED) may be disposed in the second module opening (MO-2).

The coupling antenna (CPA) may serve to harvest energy from the second module opening (MO-2) and increase power delivery to the transponder chip module (TCM) in the first module opening (MO-1), via inductive coupling.

When there is no module disposed in the second module opening (MO-2), the coupling antenna's purpose may be to increase energy harvesting, without the need for data transfer.

The second module opening (MO-2) and its slit (S2) may be located at a different position on the card, such as along a top or bottom edge thereof. The module opening (MO-2) may be omitted, leaving just the slit (S2). The coupling antenna (CPA) may traverse the slits (S1, S2). A portion of the coupling antenna (CPA), more particularly of the coupling coils (CC-1, CC-2) may be disposed adjacent (such as parallel) to the slits (S1, S2).

The addition of the coupling antenna (CPA) may improve the performance of the card, making coupling with an external reader more uniform from various positions of the card.

The coupling antenna (CPA) may have open ends or may be a closed circuit. The coupling antenna (CPA) may be connected in series or parallel with other devices or circuits. For example, a light emitting diode (LED) may be connected across the coupling antenna (CPA) and housed within the second module opening (MO-2).

The coupling antenna (CPA) may be connected to capacitors and/or resistors in order to tune the signal within the coupling antenna (CPA), thus improving coupling to the transponder chip module (TCM) and increasing the communication performance of the card.

The coupling antenna (CPA) may be distinguished from any of the booster antennas described hereinabove in that it does not include a card antenna (CA) component extending around the periphery of the card.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), and claims, based on the disclosure(s) set forth herein.

What is claimed is:

1. A smartcard configured to interact with a reader, the smartcard comprising:
   a card body;
   a first module disposed in the card body, wherein the first module comprises a chip and a first antenna;

a second module disposed in the card body, wherein the second module comprises a second antenna; and at least one coupling frame disposed in the card body, wherein the at least one coupling frame is configured to interact with the reader, the first antenna, and the second antenna.

2. The smartcard, according to claim 1, wherein the first module and the second module are physically separated from one another in the card body, and are configured to communicate with one another, and both of the first module and the second module are configured to receive power to operate, and wherein the first module and the second module are configured to establish a wireless RF connection between each other.

3. The smartcard, according to claim 1, wherein each of the at least one coupling frame comprises a metal layer or a metal card body having at least one opening and at least one corresponding slit extending from a corresponding one of the at least one opening to an outer edge of the metal layer or metal card body.

4. The smartcard, according to claim 1, wherein:
the first module is disposed in a first opening in the card body; and
the second module is disposed in a second opening in the card body.

5. The smartcard, according to claim 1, further comprising:
a coupling antenna comprising first and second coupler coils associated with the first module and the second module, respectively, and no card antenna component;
wherein the first and second coupler coils are hard-wire connected with one another.

6. The smartcard, according to claim 5, wherein:
the first module comprises a first module antenna;
the second module comprises a second module antenna;
the first coupler coil is disposed in proximity with the first module antenna; and
the second coupler coil is disposed in proximity with the second module antenna.

7. The smartcard, according to claim 1, wherein at least one of the first and second modules comprises at least one electronic component and a module antenna.

8. The smartcard, according to claim 1, wherein:
the first module comprises a transponder chip module; and
the second module comprises a display module.

9. The smartcard, according to claim 8, wherein the transponder chip module is a dual-interface module having contact pads.

10. A smartcard comprising a metal layer, having a first opening for a first module and a second opening for a second module wherein the first module and the second module are physically separated from one another in the metal layer, yet need to communicate with one another, and both of the first module and the second module requiring power to operate, and a wireless RF connection is established between the first module and the second module.

11. The smartcard, according to claim 10, wherein:
the first module is a transponder chip module; and
the second module is a display module.

12. The smartcard, according to claim 10, further comprising:
a first slit extending from the first opening to an edge of the metal layer; and
a second slit extending from the second opening to an edge of the metal layer.

13. The smartcard, according to claim 10, further comprising a coupling antenna having a first coupler coil and a second coupler coil associated with and disposed close to the first module and the second module, respectively, within an interior area of the smartcard.

14. The smartcard, according to claim 10, further comprising a coupling antenna comprising a first coupler coil and a second coupler coil overlapping, within or in close proximity to a first module opening for the first module and a second module opening for the second module, respectively.

15. The smartcard, according to claim 14, wherein:
the first module is a transponder chip module; and
the coupling antenna serves to harvest energy from the second opening and increase power delivery to the transponder chip module in the first opening, via inductive coupling.

16. The smartcard, according to claim 14, further comprising:
a first slit extending from the first module opening to an edge of the metal layer; and
a second slit extending from the second module opening to an edge of the metal layer or metal card body,
wherein the coupling antenna traverses the slits.

17. A method of communicating data between two distinct modules of a smartcard having a coupling frame, comprising from a first module, communicating wirelessly with the second module.

18. The method of claim 17, wherein the first module is a transponder chip module.

19. The method of claim 17, wherein the second module is a display module.

20. The method of claim 17, wherein the first module and the second module each harvest energy from an external device.

21. The method of claim 20, wherein the external device is an ATM or a POS terminal or a smartphone.

22. The method of claim 17, wherein only one of the first module and the second module harvests energy from an external device and provides energy to the other module.

23. The method of claim 17, wherein a third, energy-harvesting module harvests energy from an external device.

24. A smartcard comprising:
a card body having a first opening for a first module and a second opening for a second module,
wherein the first module and the second module are physically separated from one another in the card body, yet need to communicate with one another, and both of the first module and the second module requiring power to operate, and
a wireless RF connection is established between the first module and the second module.

25. The smartcard, according to claim 24, further comprising a coupling antenna comprising two coupler coils and overlapping, within or in close proximity to the first opening and the second opening.

26. The smartcard, according to claim 25, wherein:
the first module is a transponder chip module; and
serves to harvest energy from the second opening and increase power delivery to the transponder chip module in the first opening, via inductive coupling.

27. The smartcard, according to claim 25, further comprising:
a first slit extending from the first opening to an edge of the card body; and
a second slit extending from the second opening to an edge of the card body;
wherein the coupling antenna traverses the slits.

* * * * *